(12) United States Patent
Burd

(10) Patent No.: US 9,840,125 B2
(45) Date of Patent: Dec. 12, 2017

(54) AIRCRAFT GALLEY WITH AIR-THROUGH CARTS

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 556 days.

(21) Appl. No.: 14/465,082

(22) Filed: Aug. 21, 2014

(65) Prior Publication Data

US 2015/0059384 A1   Mar. 5, 2015

Related U.S. Application Data

(60) Provisional application No. 61/872,459, filed on Aug. 30, 2013.

(51) Int. Cl.
*B60H 1/00* (2006.01)
*B64D 11/04* (2006.01)
*B64D 13/06* (2006.01)

(52) U.S. Cl.
CPC ..... *B60H 1/00014* (2013.01); *B60H 1/00021* (2013.01); *B64D 11/04* (2013.01); *B64D 13/06* (2013.01); *B60H 2001/00185* (2013.01); *B64D 2013/0629* (2013.01)

(58) Field of Classification Search
CPC ............ B60H 1/00014; B60H 1/00021; B60H 2001/00185; B64D 11/04; B64D 11/0007; B64D 13/06; B64D 2013/0629; B62B 3/003; B62B 5/00

USPC ........................... 454/76, 143, 188, 193, 370
See application file for complete search history.

(56) References Cited

U.S. PATENT DOCUMENTS

| | | | |
|---|---|---|---|
| 2,338,382 A | | 1/1944 | Marlow |
| 2,432,587 A | | 12/1947 | Ramsey |
| 3,982,584 A | | 9/1976 | Spanoudis |
| 4,323,110 A | | 4/1982 | Rubbright et al. |
| 4,361,014 A | * | 11/1982 | Blain .................... A47J 39/006 62/237 |
| 5,346,127 A | | 9/1994 | Creighton |
| 6,845,627 B1 | * | 1/2005 | Buck ..................... B64D 11/04 165/919 |

(Continued)

FOREIGN PATENT DOCUMENTS

GB    1385989 A  *  3/1975  ............... F16J 15/34

OTHER PUBLICATIONS

International Search Report, dated Nov. 21, 2014, 3 pages, from PCT/US2014/053010 published as WO2015/031539 on Mar. 5, 2015.

*Primary Examiner* — Gregory Huson
*Assistant Examiner* — Dana Tighe
(74) *Attorney, Agent, or Firm* — Donna P. Suchy

(57) ABSTRACT

An apparatus for air-through cooling of aircraft galley food carts includes one or more chilled galley food cart bays and one or more galley chiller air supply and return ducting assemblies including a supply airflow duct and a bifurcated return airflow duct. Airflow balance baffles may be placed at the air return outlet portions and the supply airflow duct inlet portion, and interfaces between galley food carts and supply outlet ports and return inlet ports resilient may include resilient or insulated seals, and spring loaded sealing flaps opened by contact with a portion of a galley food cart.

20 Claims, 5 Drawing Sheets

(56) References Cited

U.S. PATENT DOCUMENTS

| | | |
|---|---|---|
| 7,231,778 B2 | 6/2007 | Rigney et al. |
| 2008/0156031 A1 | 7/2008 | Cur et al. |
| 2008/0193738 A1* | 8/2008 | Hensley .................... C08J 9/32 |
| | | 428/308.4 |
| 2010/0224726 A1 | 9/2010 | Lu et al. |
| 2011/0111196 A1* | 5/2011 | Hubbs .................... B32B 38/08 |
| | | 428/220 |

* cited by examiner

AIRCRAFT GALLEY WITH AIR-THROUGH CARTS

CROSS-REFERENCES TO RELATED APPLICATIONS

This application is based upon and claims priority from U.S. Application No. 61/872,459, filed Aug. 30, 2013, incorporated by reference in its entirety.

BACKGROUND

This invention relates to transport aircraft galley systems, and more particularly, to systems to cool food carts prior to service by the cabin attendants.

Aircraft galley systems for modern transport aircraft incorporate food carts which are cooled to prevent food spoilage prior to use by the cabin attendants for distribution of food to passengers. These food carts are commonly interfaced with cold air supply systems in the galley designed to cool the interiors of the food carts. Such cool air distribution systems interface with the food carts by means of sealing gaskets connecting the food carts to a plenum providing the cool air. Galley cooling systems are typically mounted in a galley cabinet, so that cool air is discharged from the galley cooling system and circulates over or through galley food carts in a galley cabinet to return to the galley cooling system to again be cooled and discharged. Air-through galley food carts typically include grills built into a door of the galley food carts to allow air circulation directly over food inside.

It would be desirable to provide a system allowing the installation and chilling by an air chiller of air-through type galley food carts within an aircraft galley having a reduced footprint of 35 and 37 inches deep, by narrow section duct work integrated into a back wall of a galley, having the ability to chill conventionally sized air-through carts in a reduced depth galley, using an air supply work deck plenum that is built into a work deck of the galley. The present invention meets these and other needs.

SUMMARY OF THE INVENTION

Briefly and in general terms, the present invention provides for an apparatus for air-through cooling of aircraft galley food carts, including a galley chiller air supply and return ducting assembly that allows the chilling of conventional air-through carts by narrow section duct work integrated into a back wall of a galley, allows chilling conventionally sized air-through carts in a reduced depth galley using an air supply work deck plenum that is built into the work deck of the galley, and that can be installed on center line galleys, or lateral galleys.

The present invention accordingly provides for an apparatus for air-through cooling of aircraft galley food carts, including a chilled galley food cart bay configured to removably receive one or more aircraft galley food carts at a front portion of the chilled galley food cart bay, and a galley chiller air supply and return ducting assembly preferably including a supply airflow duct and a bifurcated return airflow duct at a rear portion of the chilled galley food cart bay configured to be removably connected to an aircraft galley food cart received in the chilled galley food cart bay. The supply airflow duct includes a supply airflow duct inlet portion configured to receive a chilled supply airflow from a chiller unit and a supply airflow duct outlet portion configured to supply the chilled supply airflow to the aircraft galley food cart. The bifurcated return airflow duct includes an air return inlet portion configured to receive a return airflow from the aircraft galley food cart and a pair of bifurcated return airflow duct portions extending from the air return inlet portion and preferably passing on opposing sides of the supply airflow duct. The pair of bifurcated return airflow duct portions preferably includes a pair of air return outlet portions configured to deliver the return airflow for cooling of the return airflow.

In another presently preferred aspect, the apparatus may optionally include an air supply work deck plenum configured to supply the chilled supply airflow, and a supply air duct connection adapter connected between the air supply work deck plenum and the supply airflow duct inlet portion. In another presently preferred aspect, the apparatus may optionally include flow restrictor plates or airflow balance baffles placed at the air return outlet portions and the supply airflow duct inlet portion, respectively.

In another presently preferred aspect, the supply airflow duct and the bifurcated return airflow duct are internally insulated. In another presently preferred aspect, the chilled galley food cart bay may optionally be configured to removably receive a plurality of galley food carts and include a plurality of galley chiller air supply and return ducting assemblies. In a presently preferred aspect, the apparatus may optionally include a return airflow duct plenum configured to interface with bifurcated air return outlet portions of a plurality of galley chiller air return ducting assemblies.

In another presently preferred aspect, the supply airflow duct outlet portion is fitted with a resilient seal, such as a double walled silicone bellows, for example, or an insulated seal, such as an impregnated silicone foam seal, for example. In another presently preferred aspect, the air return inlet portion is fitted with a resilient seal, such as a double walled silicone bellows, for example or an insulated seal, such as an impregnated silicone foam seal, for example. In another presently preferred aspect, the insulated seal is a water impermeable flexible cellular foam collar at least partially impregnated with a chemical agent.

In another presently preferred aspect, the supply airflow duct outlet portion and the air return inlet portion each include a spring loaded sealing flap biased outwardly by a flap closure spring to a closed position, wherein the spring loaded sealing flap is configured to seal against an aperture seal of the supply airflow duct outlet portion and the air return inlet portion, respectively, and is moveable inwardly to an open position by inward pressure against a sliding push actuator connected to the spring loaded sealing flap and extending outwardly toward the front portion of the chilled galley food cart bay from the spring loaded sealing flap and configured to be pushed inwardly to open the spring loaded sealing flap by contact with a portion of a galley food cart. In another presently preferred aspect, when the supply airflow duct outlet portion or air return inlet portion are fitted with a resilient seal or an insulated seal, the sliding push actuator extends outwardly toward a front portion of the chilled galley food cart bay through the resilient seal or insulated seal.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
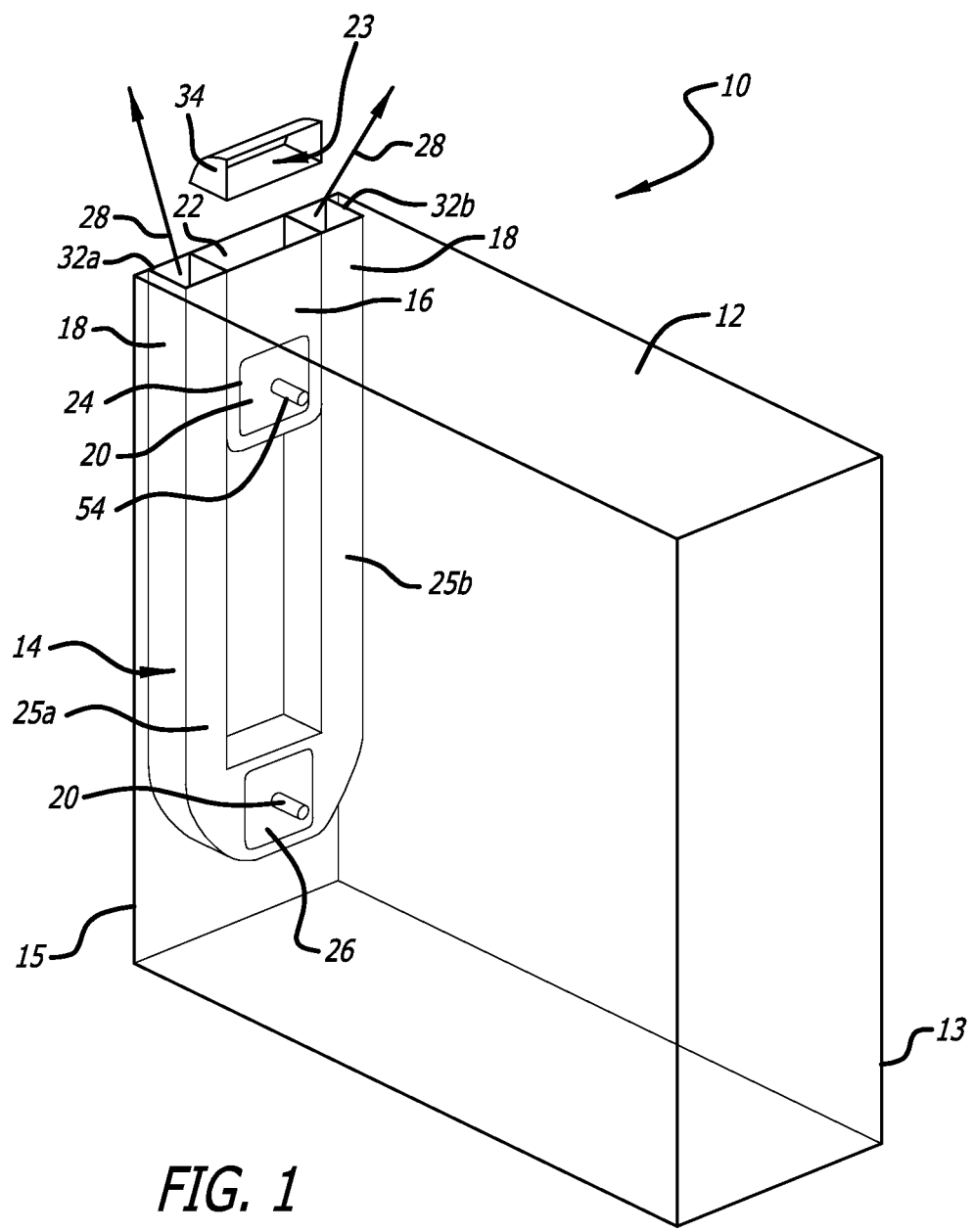
FIG. 1 is a schematic diagram illustrating the apparatus for air-through cooling of aircraft galley food carts according to the invention.

Referring to the drawings, which are provided by way of example, and not by way of limitation, the present invention provides for an apparatus 10 for air-through cooling of aircraft galley food carts, including one or more chilled galley food cart bays 12 for removably receiving one or more corresponding aircraft galley food carts (not shown), respectively at a front portion 13 of the chilled galley food cart bays. Each of the chilled galley food cart bays includes one or more galley chiller air supply and return ducting assemblies 14 at a rear portion 15 of the chilled galley food cart bays, configured to be removably connected to the corresponding aircraft galley food carts, respectively.

Each of the air supply and return ducting assemblies includes a supply airflow duct 16, and a bifurcated return airflow duct 18 including inlet/outlet ports 20, illustrated in more detail in FIGS. 6A-6D. The supply airflow duct includes a supply airflow duct inlet portion 22 configured to receive a chilled supply airflow 23 from a chiller unit via a plenum integrated into the work deck (not shown), and a chilled air outlet or supply airflow duct outlet portion 24, configured to supply the chilled supply airflow to one of the corresponding aircraft galley food carts. The bifurcated return airflow duct includes a pair of bifurcated return airflow duct portions 25a, 25b extending from an air return inlet portion 26, and passing on opposing sides of the supply airflow duct, and configured to receive a return airflow 28 from the corresponding aircraft galley food carts, and with a pair of air return outlet portions 32a, 32b configured to deliver the return airflow to the evaporator of the chiller unit via interconnecting duct work. In a presently preferred aspect, the ducts in each of the air supply and return ducting assemblies are typically internally insulated, such as with 3-4 mm thick vacuum insulated panel, for example.

Figure 2:
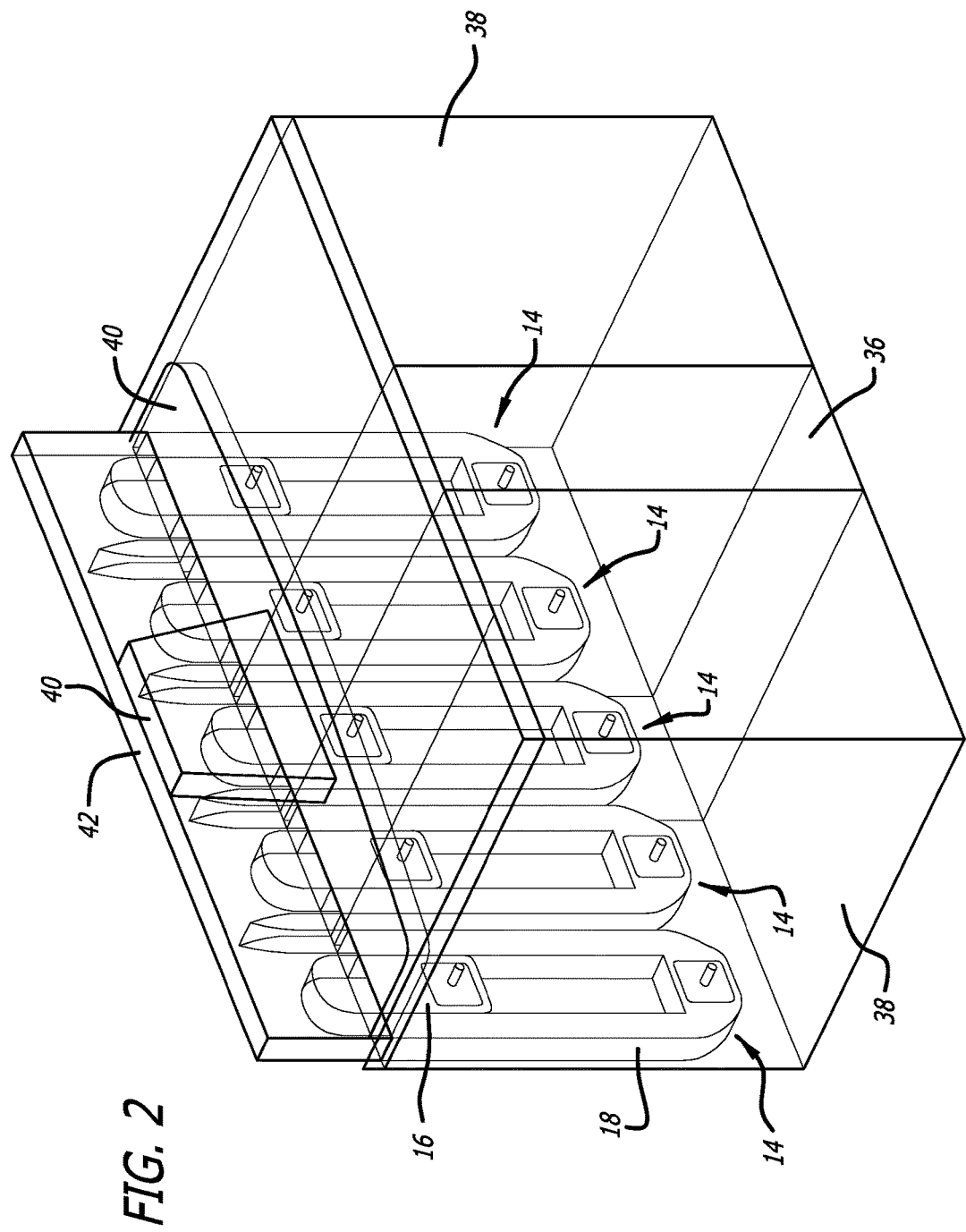
FIG. 2 is a schematic diagram illustrating a variation of the invention including one or more chilled galley food cart bays adapted for receiving multiple galley food carts and including a plurality of the galley chiller air supply and return ducting assemblies for air-through cooling of multiple aircraft galley food carts.
Figure 5:
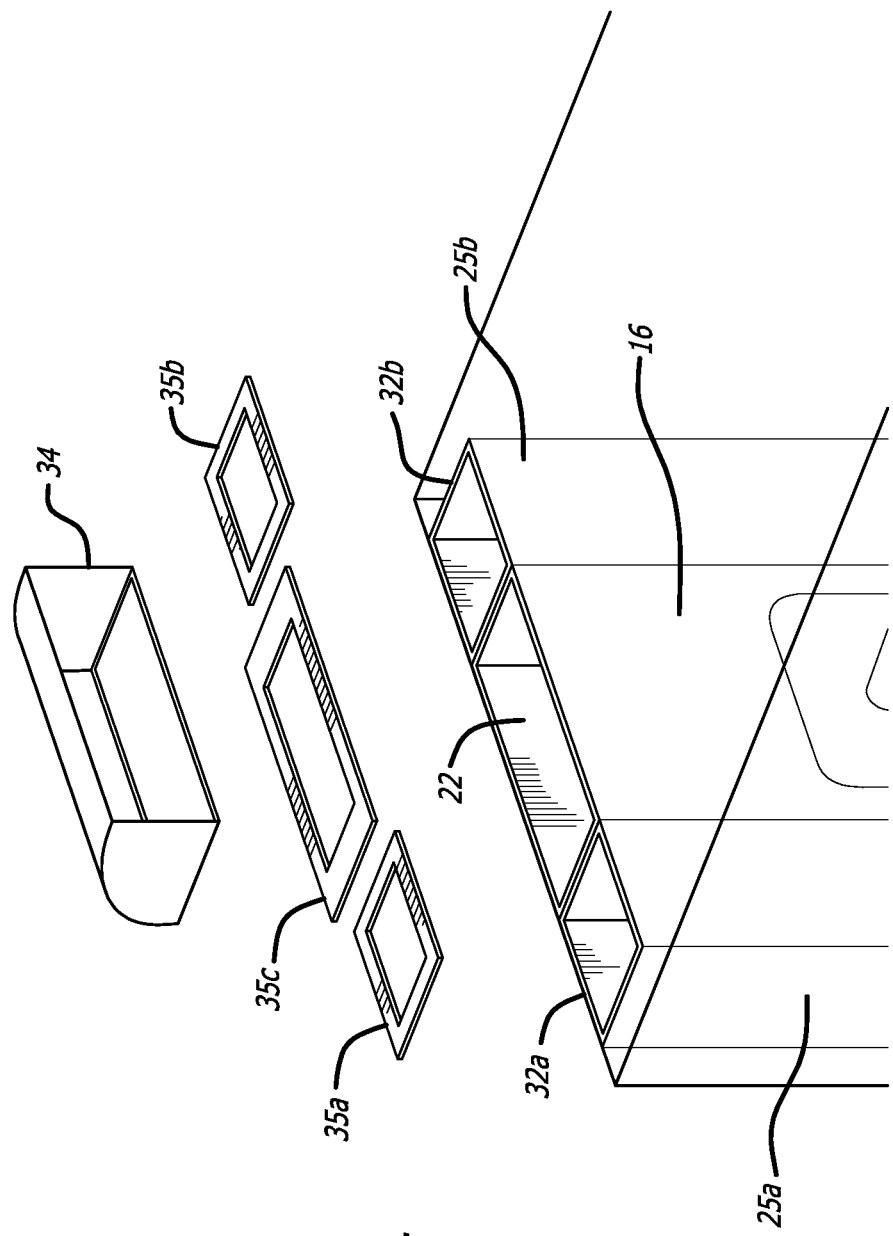
FIG. 5 is a schematic diagram of an upper portion of the supply and return ducts illustrating placement of airflow balance baffles and a supply air duct connection adapter.

As is illustrated in FIGS. 1, 2 and 5, a supply air duct connection adapter 34 may optionally be provided to interface between an air supply work deck plenum and the supply airflow duct inlet portion. The galley chilled air supply and return ducts may optionally also be individually and/or collectively balanced by appropriately dimensioned flow restrictor plates or airflow balance baffles 35a,b,c typically placed at the air return outlet portions and the supply airflow duct inlet portion, respectively, such as at an interface with fixed lower and removable upper back walls of the galley.

As is illustrated in FIG. 2, the apparatus of the invention may be implemented to interface with a single galley food cart received in a single cart bay 36, or to interface with multiple galley food carts received in one or more multiple cart bays 38, which can be provided an air supply work deck plenum 40 configured to interface with multiple individual supply air duct connection adapters, or directly with supply airflow duct inlet portions, and a return airflow duct plenum 42 partially shown configured to interface with bifurcated air return outlet portions of individual bifurcated return airflow ducts for the multiple galley food carts.

Figure 3:
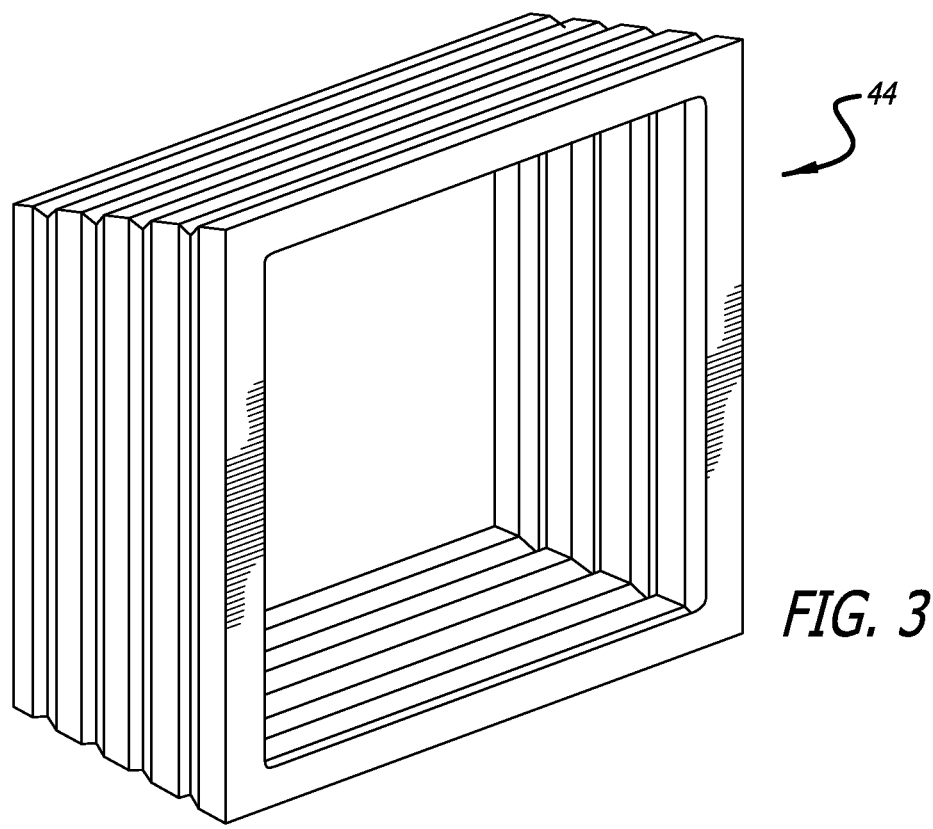
FIG. 3 is a schematic diagram of a resilient seal adapted to be fitted to each of the supply airflow duct outlet portion and the air return inlet portion of the apparatus of FIG. 1 or FIG. 2.
Figure 4:
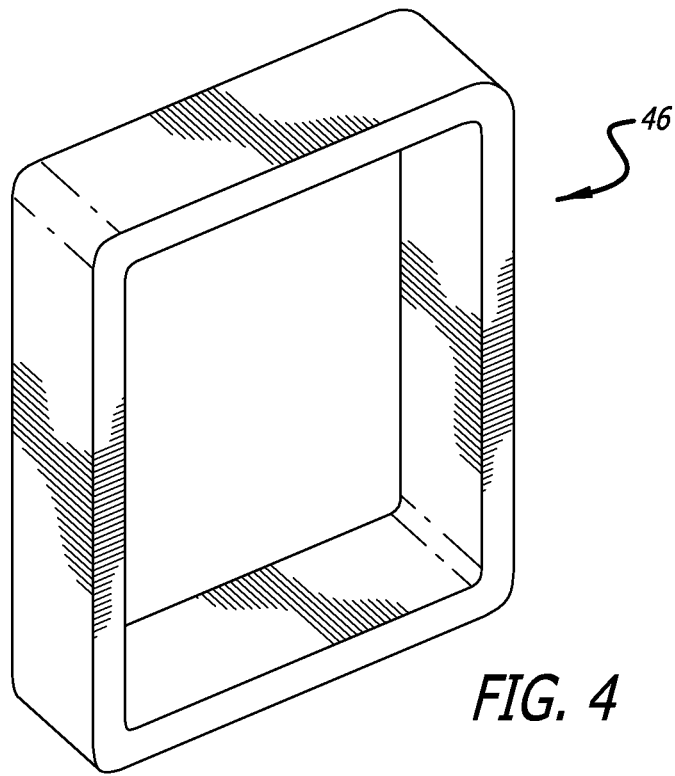
FIG. 4 is a schematic diagram of an insulated collar adapted to be fitted to each if the supply airflow duct outlet portion and the air return inlet portion of the apparatus of FIG. 1 or FIG. 2.

Referring to FIGS. 3 and 4, in a presently preferred aspect, the supply airflow duct outlet portion or chilled air outlet flap and the air return inlet portion or return air inlet flap optionally may each fitted with a resilient seal, such as a resilient silicone collar or a resilient air insulated double walled silicone bellows or collar 44, or an insulated seal, such as an impregnated silicone foam seal 46, such as a water impermeable flexible cellular foam collar fully or partially impregnated with a chemical agent, and that can further include a coating of another compatible material such as silicone, for example.

Figure 6A:
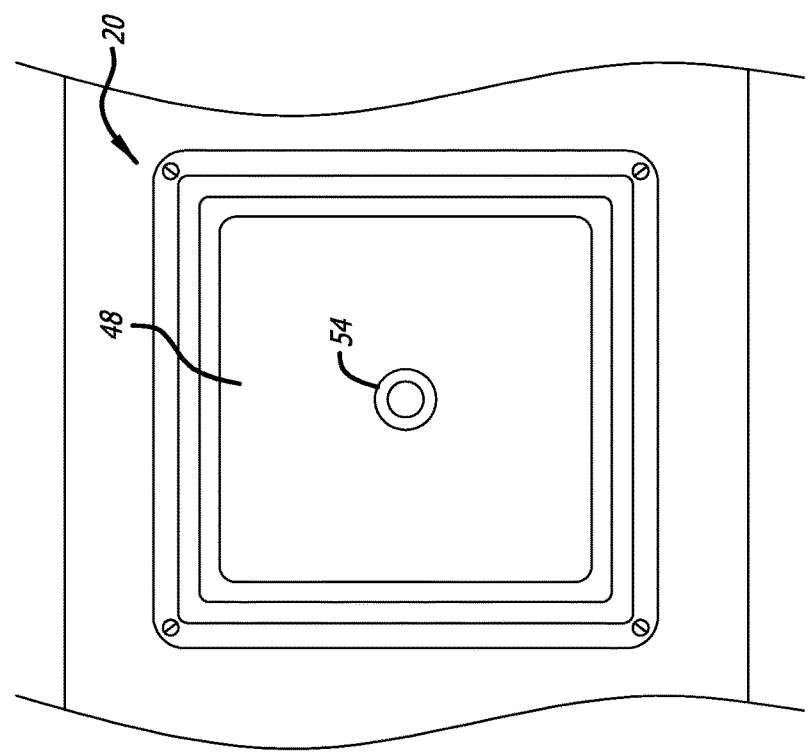
FIG. 6A is an enlarged partial sectional view of a reduced duct depth supply or return port including a spring loaded self-closing low restriction flap of the apparatus of FIG. 1 or FIG. 2, showing the flap in a closed position closing the port.
Figure 6B:
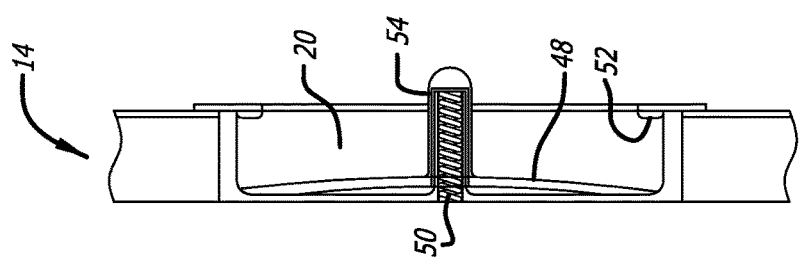
FIG. 6B is an enlarged partial sectional view similar to FIG. 6A, showing the flap in a partially open position partially opening the port.
Figure 6C:
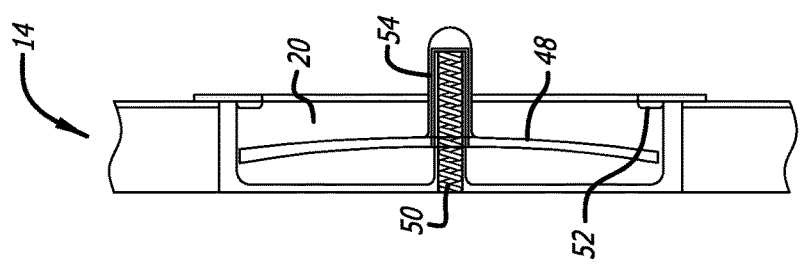
FIG. 6C is an enlarged partial sectional view similar to FIG. 6A, showing the flap in a fully open position fully opening the port.
Figure 6D:
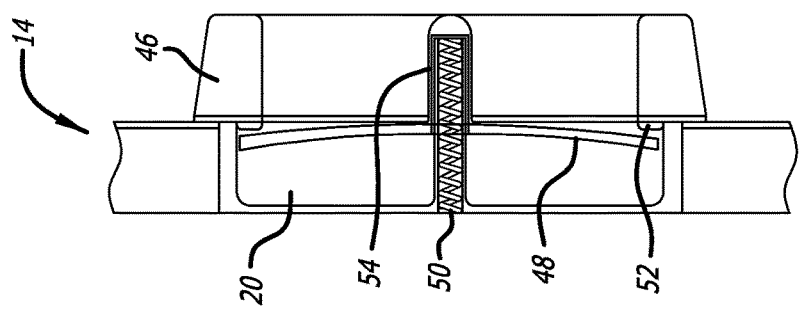
FIG. 6D is an enlarged front view of the port of FIG. 6A, showing the flap in a closed position closing the port.

Referring to FIGS. 6A-6D, each of the chilled air outlet or supply airflow duct outlet portion and the air return inlet portion typically include a spring loaded sealing flap 48 biased outwardly by a flap closure spring 50 to a closed position, shown in FIG. 6A, sealing against an aperture seal 52 of the inlet/outlet port, such as the chilled air outlet or supply airflow duct outlet portion or the air return inlet portion, respectively, and moveable inwardly to an open position, shown in FIGS. 6B and 6C, by inward pressure against a sliding push actuator or contact stub 54 connected to the spring loaded sealing flap and extending outwardly toward a front portion of the chilled galley food cart bay from the spring loaded sealing flap through the chilled air outlet or supply airflow duct outlet portion or the air return inlet portion, respectively, and configured to be pushed inwardly to open the spring loaded sealing flap by contact with a portion of a galley food cart, such as an I/O grill of a galley food cart (not shown), for example. When optional resilient or insulated seals are fitted to a supply airflow duct outlet portion and the air return inlet portion, the sliding push actuator or contact stub typically extends outwardly toward a front portion of the chilled galley food cart bay through the resilient or insulated seals as well. The invention allows the installation and chilling by an air chiller of air-through type carts within an aircraft galley having a reduced footprint of 35 and 37 inches deep.

The apparatus for air-through cooling of aircraft galley food carts according to the present invention allows the chilling of conventional air-through carts by narrow section duct work integrated into a back wall of a galley, and provides the ability to chill conventionally sized air-through carts in a reduced depth galley, using an air supply work deck plenum that is built into the work deck of the galley. The system is capable of being installed on center line galleys, or lateral galleys.

It will be apparent from the foregoing that while particular forms of the invention have been illustrated and described, various modifications can be made without departing from the spirit and scope of the invention. Accordingly, it is not intended that the invention be limited, except as by the appended claims.

I claim:

1. An apparatus for air-through cooling of aircraft galley food carts, comprising:
   a chilled galley food cart bay having a front portion and a rear portion, said chilled galley food cart bay being configured to removably receive a suitable aircraft galley food cart at said front portion of the chilled galley food cart bay; and
   a galley chiller air supply and return ducting assembly disposed at said rear portion of said chilled galley food cart bay, said galley chiller air supply and return ducting assembly being configured to be removably connected to a single galley food cart received in said chilled galley food cart bay, said air supply and return ducting assembly including
      a supply airflow duct including a supply airflow duct inlet portion configured to receive a chilled supply airflow from a remote chiller unit, and a supply airflow duct outlet portion corresponding to the single galley food cart, the supply airflow duct outlet portion configured to supply the chilled supply airflow to the single galley food cart upon coupling the single galley food cart to the galley chiller air supply and return ducting assembly, and
      a bifurcated return airflow duct including
         an air return inlet portion corresponding to the single galley food cart, the air return inlet portion configured to receive a return airflow from the single aircraft galley food cart upon coupling the single galley food cart to the galley chiller air supply and return ducting assembly, and
         a pair of bifurcated return airflow duct portions extending from said air return inlet portion and passing on opposing sides of said supply airflow duct, said pair of bifurcated return airflow duct portions including a pair of air return outlet portions configured to deliver the return airflow to the air chiller for recooling.

2. The apparatus of claim 1, wherein said supply airflow duct and said bifurcated return airflow duct are internally insulated.

3. The apparatus of claim 1, further comprising an air supply work deck plenum configured to supply the chilled supply airflow, and a supply air duct connection adapter connected between said air supply work deck plenum and said supply airflow duct inlet portion.

4. The apparatus of claim 1, further comprising flow airflow balance baffles placed at the air return outlet portions and the supply airflow duct inlet portion, respectively.

5. The apparatus of claim 1, wherein said chilled galley food cart bay comprises a plurality of said galley chiller air supply and return ducting assemblies and is configured to removably receive a plurality of galley food carts.

6. The apparatus of claim 5, further comprising a return airflow duct plenum configured to interface with said plurality of return ducting assemblies.

7. The apparatus of claim 5, further comprising a return airflow duct plenum configured to interface with bifurcated air return outlet portions of said plurality of said galley chiller air supply and return ducting assemblies.

8. The apparatus of claim 1, wherein said supply airflow duct outlet portion is fitted with a resilient seal.

9. The apparatus of claim 8, wherein said resilient seal comprises a double walled silicone bellows.

10. The apparatus of claim 8, wherein said supply airflow duct outlet portion and said air return inlet portion each include a spring loaded sealing flap biased outwardly by a flap closure spring to a closed position, wherein said spring loaded sealing flap is configured to seal against an aperture seal of the supply airflow duct outlet portion and the air return inlet portion, respectively, and is moveable inwardly to an open position by inward pressure against a sliding push actuator connected to the spring loaded sealing flap and extending outwardly toward the front portion of the chilled galley food cart bay from the spring loaded sealing flap and configured to be pushed inwardly to open the spring loaded sealing flap by contact with a portion the single galley food cart, and wherein said sliding push actuator extends outwardly towards a front portion of the chilled galley food cart bay through the resilient seal.

11. The apparatus of claim 1, wherein said air return inlet portion is fitted with a resilient seal.

12. The apparatus of claim 11, wherein said resilient seal comprises a double walled silicone bellows.

13. The apparatus of claim 1, wherein said supply airflow duct outlet portion is fitted with an insulated seal.

14. The apparatus of claim 13, wherein said insulated seal comprises an impregnated silicone foam seal.

15. The apparatus of claim 13, wherein said insulated seal comprises a water impermeable flexible cellular foam collar at least partially impregnated with a chemical agent.

16. The apparatus of claim 13, wherein said supply airflow duct outlet portion and said air return inlet portion each include a spring loaded sealing flap biased outwardly by a flap closure spring to a closed position, wherein said spring loaded sealing flap is configured to seal against an aperture seal of the supply airflow duct outlet portion and the air return inlet portion, respectively, and is moveable inwardly to an open position by inward pressure against a sliding push actuator connected to the spring loaded sealing flap and extending outwardly toward the front portion of the chilled galley food cart bay from the spring loaded sealing flap and configured to be pushed inwardly to open the spring loaded sealing flap by contact with a portion the single galley food cart, and wherein said sliding push actuator extends outwardly towards a front portion of the chilled galley food cart bay through the insulated seal.

17. The apparatus of claim 1, wherein said air return inlet portion is fitted with an insulated seal.

18. The apparatus of claim 17, wherein said insulated seal comprises an impregnated silicone foam seal.

19. The apparatus of claim 17, wherein said insulated seal comprises a water impermeable flexible cellular foam collar at least partially impregnated with a chemical agent.

20. The apparatus of claim 1, wherein said supply airflow duct outlet portion and said air return inlet portion each include a spring loaded sealing flap biased outwardly by a flap closure spring to a closed position, wherein said spring loaded sealing flap is configured to seal against an aperture seal of the supply airflow duct outlet portion and the air return inlet portion, respectively, and is moveable inwardly to an open position by inward pressure against a sliding push actuator connected to the spring loaded sealing flap and extending outwardly toward the front portion of the chilled galley food cart bay from the spring loaded sealing flap and configured to be pushed inwardly to open the spring loaded sealing flap by contact with a portion of the single galley food cart.

\* \* \* \* \*